Dec. 14, 1937.  W. PANNIKE  2,102,213

ROOT CROP DIGGING DEVICE

Filed April 22, 1936

Inventor:
Walter Pannike
by Geo. H. Parker
ATTORNEY

Patented Dec. 14, 1937

2,102,213

UNITED STATES PATENT OFFICE 2,102,213

ROOT CROP DIGGING DEVICE

Walter Pannike, Waterloo, Ontario, Canada

Application April 22, 1936, Serial No. 75,794
In Germany January 23, 1936

5 Claims. (Cl. 55—54)

This invention relates to a device for digging root crops such as potatoes, carrots, beets and the like, the device being attachable to a frame mounted on carrying-wheels similar to that disclosed in German Patent No. 546,384 granted to Richard Muller. The device is attached to said frame forward of vibratory screening bars similar to those shown in the said patent but as these are well known to the art and as they do not form any part of the present invention, they are not illustrated in the accompanying drawing.

The object of my invention is to provide a device for digging root crops such as potatoes, carrots, beets, turnips, etc. in such a manner that the tubers or roots are not, in any way, injured and when the digging operation is completed, the root or tuber will be lying on the surface of the ground. A further object is to provide a device which will operate satisfactorily in stony ground, wet ground and in fields overgrown with weeds.

Figure 1:
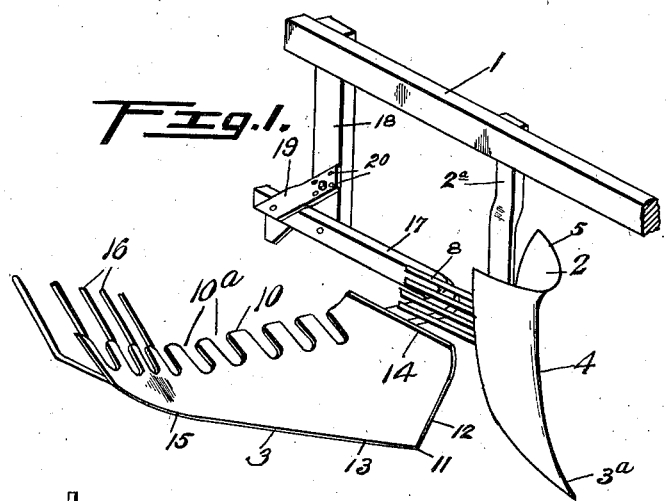
Figure 2:
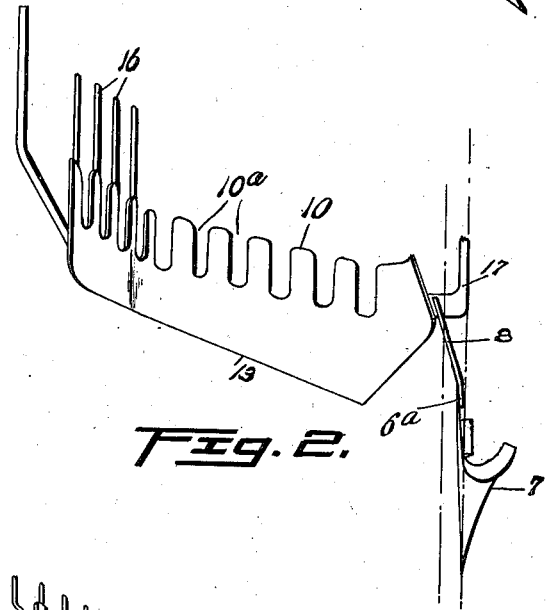
Figure 3:
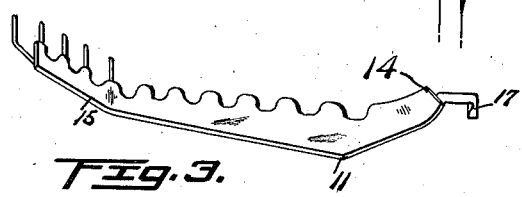

This object is accomplished by the shape or form of the stalk remover and the shape or form of the share all of which is more particularly described and set forth in the following description making reference to the accompanying drawing in which Figure 1 is a perspective view of the stalk remover and share constructed in accordance with my invention Figure 2 is a plan view of the device shown in Figure 1, and Figure 3 is a front elevation of the share.

Like characters of reference refer to like parts throughout the specification.

My invention comprises two essential parts which co-operate in the digging of root crops such as potatoes, carrots, beets, onions and the like, these two parts consisting of a stalk remover and a share.

In the drawing, 1 indicates that part of the frame which is mounted on the carrying-wheels and to this is attached the stalk remover 2 and the share 3 which is attached to the frame rearward of the stalk remover. The stalk remover has its lower end pointed as indicated at 3a and curved slightly forwardly in the direction of travel. The forward edge 4 of the stalk remover arcuately curves from the point 3a upwardly and rises gradually to almost perpendicular at the top thereof where it is curved to form an outwardly flared rim 5. The right side 6 of the stalk remover is substantially flat and perpendicular but is given a slight angle so that its rearward vertical edge 6a will be substantially in a line with the left side of the share. The left side 7 of the stalk remover curves upwardly and away from the front edge thereof substantially as shown. Secured to the inner side of the right side 6 and extending rearwardly therefrom in a substantially horizontal plane are grills or bars 8, these bars being bent as indicated so that they will be substantially directly above the left side of the share. The stalk remover is provided with an arm 2a which is rigidly attached to the frame 1 in a suitable manner.

The share is specially shaped to dig the root crop and assist in the separation of such crop from the soil but since it is rather irregular in shape, it is difficult to accurately describe the same. However, the share has a configuration somewhat similar to a scoop having upturned sides and a forward pointed cutting edge. The rearward edge 10 of the share is notched as indicated at 10a. The share is provided with a forward cutting edge which comes to a point 11, the side 12 of the cutting edge being substantially shorter than the side 13 of the cutting edge. The bottom portion of the share is substantially flat and has the left side thereof curved upwardly and rearwardly at an angle as indicated at 14 to give the earth or soil a line of travel towards the centre of the share and the right side of the share is somewhat similarly curved as indicated at 15 so that it will tend to push the earth towards the middle of the share. Extending rearwardly from the upwardly curved portion 15 are grill bars 16. The share is rigidly and permanently attached to a member 17, this member being attached to a downwardly extending bar 18, secured to the frame 1. Attached to the member 18 and the member 17 is a brace 19, this member 19 being provided with a plurality of orifices 20, by means of which it is possible to change the angle of elevation of the share in digging various root crops.

For example, in the digging of potatoes, the stalk remover breaks the earth in advance of the share pulling the stalks and the tubers or roots out of the ground as the ground is loosened by the share following in the rear thereof. The shape of the remover causes the soil and the root and stalk to be carried to the share. The grate irons 8 which are attached to the stalk remover assist in pulling the root closer to the surface of the earth and, at the same time, giving the earth a direction of movement over the share and assist in separating the root tuber from the earth.

The angle of elevation of the cutting edge of the share will depend on the depth of the root crop in the ground. This adjustment is effected by means of the brace 19. The elevation of the stalk remover should not be changed.

The remover travels slightly to the right of the plants being dug. The remover partly lifts the earth around the stalk. The stalk is forced against the front part of the remover and, at the same time, the shares loosen the earth around the root and tuber. It will be seen from this operation the stalk and tuber will be pulled out of the earth but the remover will allow the stalk and root to pass to the share to be subsequently entirely separated from earth. While it is quite true that there is a space between the sides 16, 14 and under the member 17, no tuber can be passed over and left undug. It is to be noted that the point 11 of the share will pass nearly down the centre of the row. Therefore, all the roots or tubers will be forced over the share.

The term "root" is used in the claims to denote any underground portion of the plant and to include tubers and bulbs.

Having thus fully described my invention what I claim is new and desire to secure by Letters Patent is:

1. In combination, apparatus for digging root crops comprising a frame, a stalk and root remover carried by said frame, a share carried by said frame to the rear of said remover, said remover being shaped to lift the stalk and root out of the ground and pass the stalk and root to the share and a grill secured to the side of the stalk remover adjacent the share and extending rearwardly therefrom in substantially a horizontal plane.

2. In combination, apparatus for digging root crops comprising a frame, a stalk and root remover carried by said frame, and a share carried by said frame to the rear of said remover, said stalk remover being shaped to lift the stalk and root out of the ground and direct the root and stalk to the share, said share being substantially flat with upturned lateral edges, a forward cutting edge tapering to a point and a rear edge provided with a plurality of spaced notches.

3. In combination, an apparatus for digging root crops comprising a frame, a stalk and root remover carried by said frame, and a share carried by said frame to the rear of said remover, said remover being shaped to lift the stalk and root out of the ground, said share being substantially flat with upturned lateral edges, a rear edge provided with a plurality of spaced notches and forward cutting edges tapering to a point, the cutting edge adjacent the stalk remover being substantially shorter than the other cutting edge.

4. In combination, apparatus for digging root crop, comprising a frame, a stalk and root remover and a share carried by said frame, said share having a substantially flat bottom portion with upturned lateral edges, a rear edge provided with spaced notches and forward cutting edges tapering to a point, one of said edges being substantially longer than the other edge.

5. In combination, apparatus for digging root crops comprising a frame a stalk, and root remover and a share carried by said frame, said share having a substantially flat bottom portion with upturned lateral edges, forward cutting edges tapering to a point, a rear edge provided with spaced notches, said lateral edges being angularly displaced inwardly from the front towards the back.

WALTER PANNIKE.